United States Patent
Holzbach et al.

(10) Patent No.: US 6,900,904 B1
(45) Date of Patent: May 31, 2005

(54) DISTRIBUTED SYSTEM FOR PRODUCING HOLOGRAPHIC STEREOGRAMS ON-DEMAND FROM VARIOUS TYPES OF SOURCE MATERIAL

(75) Inventors: Mark E. Holzbach, Austin, TX (US); Michael Anthony Klug, Austin, TX (US); Alejandro José Ferdman, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 09/498,429

(22) Filed: Feb. 4, 2000

(51) Int. Cl.[7] .................................................. G03H 1/00
(52) U.S. Cl. ......................... 358/1.15; 359/1; 359/23; 359/35
(58) Field of Search .................. 358/1.1–1.9, 1.11–1.18; 359/1, 2, 12, 15, 23, 35

(56) References Cited

U.S. PATENT DOCUMENTS

| | | | |
|---|---|---|---|
| 5,570,292 A | 10/1996 | Abraham et al. | 364/473.01 |
| 5,703,704 A | 12/1997 | Nakagawa et al. | 359/9 |
| 6,108,440 A * | 8/2000 | Baba et al. | 382/154 |
| 6,236,475 B1 * | 5/2001 | Kihara et al. | 359/23 |

FOREIGN PATENT DOCUMENTS

| | | | |
|---|---|---|---|
| DE | 19719620 A1 | 11/1998 | G01C/11/02 |
| EP | 0412657 A2 | 2/1991 | G06F/15/42 |

OTHER PUBLICATIONS

Johnny Gustaffson, "Internet–based Support for the Production of Holographic Stereograms," Proc. SPIE vol. 3293, "*Practical Holography XII,*" Mar., 1998, pp. 169–174.

* cited by examiner

Primary Examiner—King Y. Poon
(74) Attorney, Agent, or Firm—Campbell Stephenson Ascolese LLP

(57) ABSTRACT

A distributed system for producing holographic stereograms (holograms). A data acquisition station is typically remote from image processing, printing, and replicating stations. The data acquisition station is designed to maximize customer convenience, and may be the customer's own personal computer. The data acquisition station is further designed to accept a wide variety of source data and to perform whatever processing is required to deliver image data to the image processing station in an acceptable format. The data acquisition station further has processing capability to display preview images, which may be assembled by programming executing at the data acquisition station or downloaded from a server.

29 Claims, 2 Drawing Sheets

DISTRIBUTED SYSTEM FOR PRODUCING HOLOGRAPHIC STEREOGRAMS ON-DEMAND FROM VARIOUS TYPES OF SOURCE MATERIAL

TECHNICAL FIELD

This invention relates to holography, and more particularly to a distributed system for producing holographic stereograms, oriented to customer accessibility and to acceptance of a wide variety of customer-produced source material.

BACKGROUND

A holographic stereogram is a type of hologram, characterized by having been made from a series of views, which are multiplexed into a single hologram. For a hologram having only horizontal parallax, a series of vertical strips is exposed. For a full parallax hologram, exposures in two orthogonal directions are used.

More specifically, the source data for holographic stereograms is a sequence of two-dimensional (2D) views. As compared to a "true" hologram, a physical object is not directly exposed. An example of a series of 2D views is a series of views taken with a motion controlled camera. Another example is a series of views generated by computer graphics software. The views may represent a scene that is still, or they may be continuous views of a scene in motion. However, there is no requirement that the views be all related to one scene.

Once the sequence of views is obtained, they are displayed using a spatial light modulator, such as film or a liquid crystal display. Appropriate optical processing is performed, and an object beam and a reference beam are used to expose holographic film. The result is a series of small component holograms which together form an integrated holographic image. Although the source material is two-dimensional, the viewer may perceive the holographic image to be three-dimensional.

Equipment for producing holograms tends to be expensive, complex, and large, and to require skilled operators. Hologram production has tended to be a labor intensive and time consuming process, with long lead times and limited opportunity for customization to the liking of an individual purchaser.

SUMMARY OF THE INVENTION

One aspect of the invention is a system for producing holographic stereograms (holograms) on-demand by an individual customer, from source material provided by the customer. The system has at least one data acquisition station accessible to the customer. Typically, this station is remote from other equipment used for the hologram production, such as equipment for image processing and printing.

The data acquisition station may be the customer's own personal computer, such as for an e-commerce type of hologram production system, or it may be a brick and mortar site. Each data acquisition station has a data acquisition processor that receives image data based on the source material and a customer-based preview processor that displays a representation of the hologram for viewing by the customer.

The image processing station has an image processor operable to process image data received from the data acquisition station. It typically also has a preview processor, which is designed for use by the operator rather than by a customer. The printing station has a spatial light modulator for receiving data from the image processor and for displaying holographic component images, and also has a printer for producing a master holographic stereogram. The system may also include a replicating station for replicating holograms from a master hologram.

When the data acquisition station is remote from the image processing station, various types of communication links can be used between them. An advantage of the invention is that it is amenable to Internet type communications. The processing tasks executed at the data acquisition station can be downloaded from a remote server. Alternatively, the image data can be uploaded to a server, which then prepares preview images and downloads them for viewing by the customer at the data acquisition station.

DETAILED DESCRIPTION OF THE INVENTION

Figure 1:
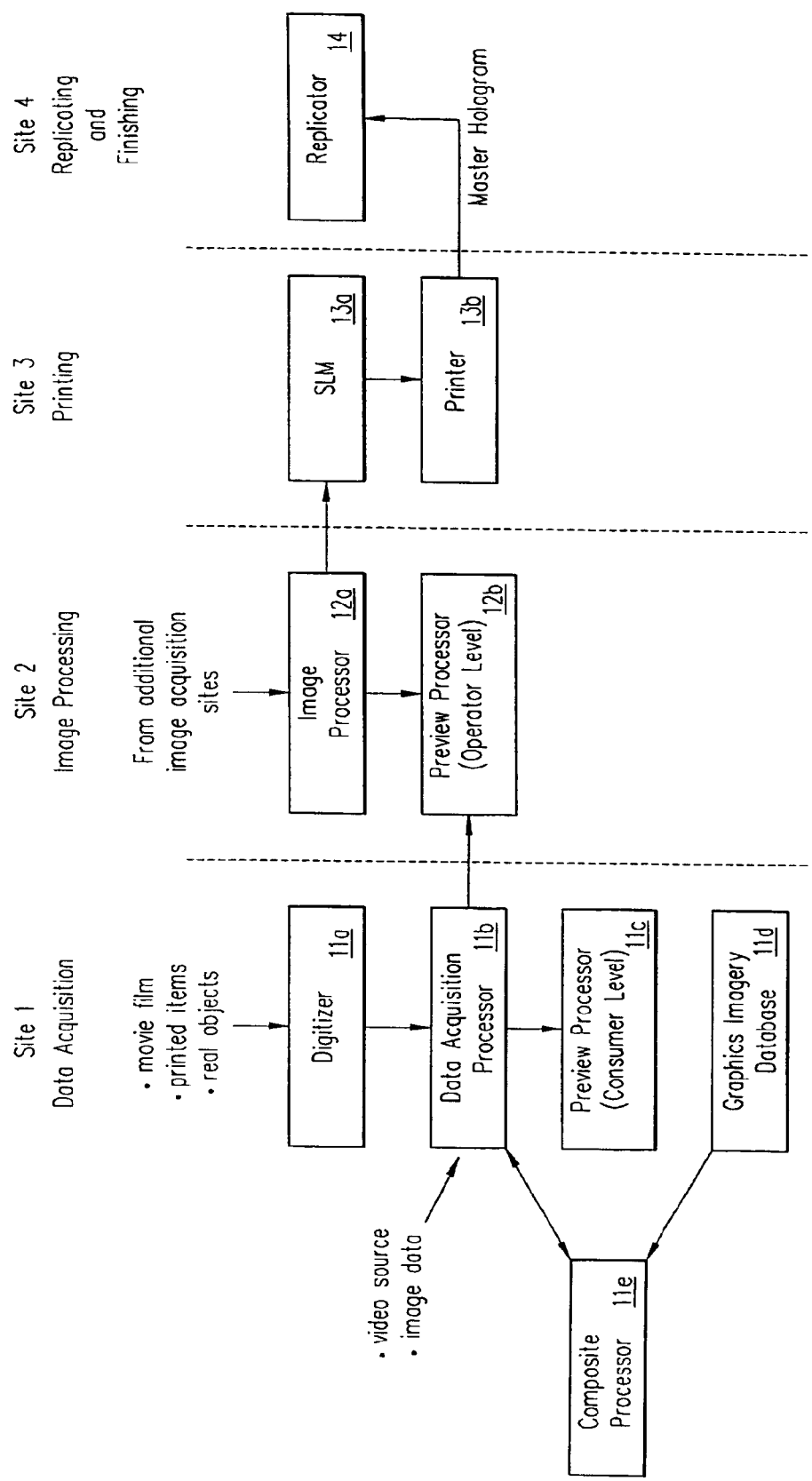
FIG. 1 illustrates a distributed system for producing holographic stereograms in accordance with the invention.

FIG. 1 is a block diagram of the basic elements of a system 10 for producing holographic stereograms in accordance with the invention. As described in the Background, holographic stereograms are characterized by having been made from data representing a sequence of two-dimensional (2D) images. For purposes of this description, holographic stereograms are referred to as "holograms", although there are other types of holograms.

As explained below, system 10 is used to produce holograms "on demand" for individual customers, from a wide variety of source material. System 10 is "on demand" in the sense that a customer may visit a local facility, order a hologram that is specific to the customer's source material and preferences, and receive a hologram responding to those specifications.

System 10 is geographically distributed among various sites. It has multiple sites for collecting image data from customers, as well as sites for processing the image data and for printing and replicating holograms.

In the embodiment of FIG. 1, each of four sites is assumed to be geographically remote from the other sites. Data is communicated electronically from one facility to another. A suitable communication means is the Internet. However, other data communication systems could be used.

In other embodiments, some sites may be co-located. For example, all image processing, printing, and replicating (shown in FIG. 1 at Sites 2, 3, and 4) could occur at a single site. However, a feature of the invention is distribution of the data acquisition sites (Site 1), and in FIG. 1 it is assumed that at least those sites are geographically remote from the other sites.

System 10 includes various "processors". These processors may be implemented with conventional computing equipment, including one or more microprocessors, memory, and input and output devices. The programming for each processor, stored in memory of that processor, is described below. The use of the term "processor" in no way limits the implementation to dedicated equipment; the processor may be implemented on general purpose equipment that performs other unrelated processes.

To obtain a hologram, the customer visits a data acquisition site (Site 1), at a location such as a shopping mall, entertainment center, or document preparation center. Another example might be a driver's license center, where system 10 is used to generate a hologram of the license recipient on each license.

Data acquisition site (Site 1) is equipped with a digitizer 11a. By "digitizer" is meant any equipment that photographs or scans two- or three-dimensional subject material and generates image or three-dimensional (3D) model data. Examples of subject material are 3D objects, printed material, and movie film. The appropriate type of digitizer depends on the subject matter, but may be a still camera, video camera, 2D scanner, or 3D scanner.

Alternatively, the customer may provide source material that is already digital, such as in the case of digital videotape, digital photographs, or graphics data files.

It should be understood that the data acquisition site (Site 1) could be the customer's own personal computer. In this case, the processor elements of the site could be installed as software by the customer or downloaded from an Internet site maintained by the hologram producer. The customer may establish a data connection to the data acquisition site, such as by means of the Internet from the customer's personal computer. Using this data link, the customer might send any form of digital image data, such as a video stream or graphics file.

Figure 2:
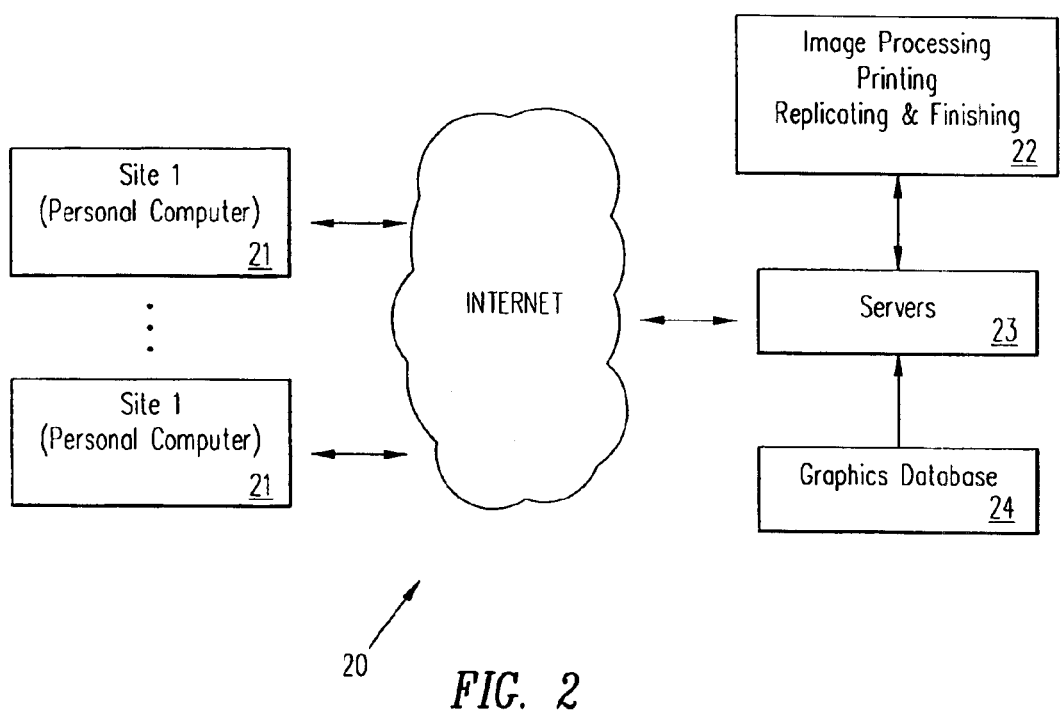
FIG. 2 illustrates a modification of the system of FIG. 1, especially suited for Internet ordering by customers.

FIG. 2 illustrates an "e-commerce" type system 20, which is a modification of the system of FIG. 1. In system 20, the data acquisition sites are personal computers 21. In the example of FIG. 2, equipment for all other tasks involved in the hologram production (those of Site 2, Site 3, and Site 4 of FIG. 1) are co-located at a single production site 22. However, these sites may be remote from each other and connected with appropriate data communication links.

For the system 20 of FIG. 2, each customer may order a hologram via a communications link, such as the Internet. The customer accesses a server 23, from which appropriate software for delivering image data and previewing holograms may be downloaded to the customer, thereby implementing the data acquisition processor and the preview processor on the customer's computer 21. Alternatively, the customer may send image data to server 23, which performs the processing tasks for the customer-based preview and returns preview images to the customer's computer 21. A graphics database 24 may be used to store graphics data, which may be selected and downloaded to the customer's computer 21. The processing tasks implemented on the customer's computer 21 and the server 22 may include data compression processing to minimize data transmission time and data storage demands.

Referring again to FIG. 1, system 10 is designed to produce holograms from many different types of source material. One type of source material is real objects, which may be inanimate objects, animals, or people. The customer provides the object, whose digital image is captured, still or in motion. The source material may be a sequence of images recorded on a pre-existing medium such as videotape or movie film. The source material may be one or more printed images, such as photographs or printed pages, to make a hologram of a sequence of these photographs or pages.

The source material may also be image data, such as that generated by graphics generating software. An example of suitable graphics data is 3D polygon-based data and associated scene description information such as colors, lighting, and textures. Other types of graphics data, such as NURB surfaces, volumetric data, point-cloud data, and particle system data may be used. The following formats are examples of suitable formats: dxf, obj, iges, tri, 3ds, max, slp, and iv.

Regardless of the type of source material, data acquisition process 11b receives image data for transmission to an image processing site (Site 2). Appropriate types of computer-generated graphics data formats may be "directly rendered" and may be transmitted without further processing. Other image data is assembled into a sequence of 2D images, having a specified number of image frames. The images may or may not represent motion, and they may or may not represent perspective views. However, a feature of the invention is the ability to provide "four dimensional" holograms having a scene with both motion and a range of perspectives.

Another feature of the invention is the capability to composite data from different types of source material. To this end, compositing processor 11e accepts image data and merges it into a desired scene. As explained below, the composited data may include image data from a pre-stored graphics database.

Preview processor 11c executes an interactive process that generates and displays a simulated representation of the hologram. It permits the user to visualize the hologram before it is printed and to make various design selections. Pre-view processor 11c is "customer-based" in that it presents the customer with a display of the simulated hologram, presents design choices to the customer, and receives input regarding design selections from the customer. As such, its graphical user interface is designed to facilitate use by customers having little knowledge about holography.

In one embodiment, the preview could be of the sequence of images collected by acquisition processor 11b. The preview permits selection of a number of frames to be actually used to produce the hologram. The customer might then be permitted to reject the sequence entirely and re-do the digitization. Or, the customer might select a particular sequence of frames from a larger sequence. Simple designs will comprise a continuous sequence of frames, but the customer might also choose alternating frames or leave a gap in frames, such as to result in a desired motion effect. The user might be permitted to select frames in terms of a beginning frame and a time period, or by identifying particular frames up to a certain number of frames.

Additional design parameters may be selected and pre-visualized by the customer, using preview process 11c. Design choices, such as lighting and framing, can be selected, displayed, and modified. Other design choices might include contrast or color variations. The interface of preview processor 11c presents these design choices to the customer and accepts and processes the customer's selections.

In other embodiments of preview processor 11c, in addition to or alternatively to a sequence of frames, preview processor 11c might present an image of the hologram as it will actually appear when printed. Effects such as blurring of features far into the foreground or background could be represented, so that the user might have the option of changing the plane of the hologram relative to the subject material. In more sophisticated embodiments, the simulated hologram might be rotatable so that the customer could perceive how it would appear from different viewing angles. Preview processor 11c permits the user to make decisions such as how the hologram is to be bounded or re-sized, accepts associated design selections, and redisplays the simulated hologram.

A graphics imagery database 11d stores graphics imagery, which can be added to the background or foreground. For example, database 11d might store text to be added. Or, as another example, a person's photographically acquired image might be placed in an imaginative locale. As explained above, compositing processor 11e performs any compositing tasks.

At an image data processing site (Site 2), image data processor 12a receives data from the data acquisition site (Site 1). As indicated above, this data may be 2D sequential data or 3D computer graphics data, depending on the source material provided by the customer. Examples of a suitable platforms for image data processor 12a are workstations operating with the UNIX or UNIX variations operating systems, Windows operating systems, or Macintosh operating systems.

The processing performed by image data processor 12a may vary depending on the type of data received from the data acquisition site. For example, where the hologram is to be printed entirely from computer graphics input data, the processing may be accomplished with double frustrum rendering or light field rendering.

In the case of 2D sequence data, image data processor 12a executes a "slice and dice" process (also referred to as block transform), which begins with a series of n frames having h×v pixels each. For horizontal parallax, a new series of h number of frames is created, each having n slices (one slice from each column of the original sequence of frames). For example, a 2D sequence might comprise 400 frames, each having 640 columns×480 rows of pixels. From this sequence, a new sequence of 640 images would be generated, each having 400 hogels (holographic columns), each being one pixel column of each source image, in the same sequence as the source images. For full parallax, the slice and dice process would be performed in both directions, resulting in a set of 640×480 images, each having 400×400 square hogels.

As indicated in FIG. 1, the image processing site may receive image data from multiple data acquisition sites. Images from one or more sites can be combined. For example, different family members might send images from different data acquisition sites to create a group family portrait. Thus, image data processor 12a is also operable to composite image data.

Graphics data may also be processed in the same manner as image sequences, rather than being double frustrum rendered. For example, the source material might be both a camera-acquired portrait and images from a computer graphics file, which are to be combined to make the hologram. The compositing may be accomplished by rendering the computer graphics file in a manner that simulates the camera that acquired the portrait, then adding that data to the portrait data.

Image processor 12a may also perform other processing, such as view zone assembly and scaling. The output of image processor 12a is referred to herein as "hogel data", which is to be displayed using some sort of spatial light modulation during the printing process.

In the system of FIG. 1, the image processing performed by processor 12a is "off line" in the sense that data for an entire hologram is prepared and stored for delivery to the SLM 13a at the printing site (Site 3). In other embodiments, processor 12a could be "on line", meaning that data for each SLM image is prepared and delivered to the SLM while the next image is being prepared. Or a hybrid system could be used, where some processing is "off line" and "on line".

Image processing site (Site 2) has a preview processor 12b, which is operator-oriented. That is, preview processor 12b is designed for use by one skilled in the production of holographic stereograms. Preview processor 12b is interactive, displays a representation of the hologram, and is used to help design the hologram. Preview processor 12b may display a sequence of frames received from data acquisition site. Like preview processor 11c preview processor 12b might also display a representation of the hologram as it would be printed. Various parameters may affect the design of the hologram, such as the boundaries of the image, its sizing, and the distance from which the hologram is to be viewed. Preview processor 12b permits the operator to modify and view changes to these parameters.

At a printing site (Site 3) SLM 13a receives the hogel data from image processor 12a. SLM 13a generates an image for each holographic element (hogel) to be exposed by printer 13b on a holographic medium. The image generated by SLM 13a is referred to herein as the "holographic object image". For horizontal parallax, each hogel is a thin strip. For full parallax, each hogel is a small rectangle (or some other geometric shape) in an 2D array of hogels. In the example of this description, SLM 13a is assumed to be a liquid crystal display.

Printer 13b exposes the holographic medium with a reference beam and object beam reflected from SLM 13a. In the embodiment of FIG. 1, printer 13b is a one-step printer system, meaning that only one exposure is required for each hogel being printed. However, the concepts described herein are also applicable to other printing systems. Various optical mechanisms are used to focus the SLM image on the holographic film. The optics vary depending on whether the hologram is to be full parallax or horizontal parallax-only. For full parallax light is focused to approximately a point; for horizontal parallax-only, light is focused as approximately a line.

The result of the printing process is a master hologram. In some embodiments of the invention, the master itself may be provided to the customer. In this case, any framing, lighting, and other finishing could occur at the printing site (Site 3).

Examples of suitable printers are described in U.S. patent Ser. No. 09/195,137 entitled "Apparatus and Method for Replicating a Hologram Using a Steerable Beam", assigned to Zebra Imaging Incorporated and incorporated herein by reference. These printers implement a one-step process for producing reflection holograms. The patent also describes various processing steps performed by image processor 12a.

A special process for producing edge-lit holograms is described in U.S. patent Ser. No. 60/120,433 entitled "System and Method for Producing and Displaying a One-Step Edge-Lit Hologram", assigned to Zebra Imaging Incorporated, and incorporated herein by reference.

Replication site (Site 4) is used when holograms are to be replicated from a master hologram. It receives the master hologram from the printing site and replicates the hologram, such as by means of a contact copy process. Various finishing procedures may also occur here, such as for framing and illumination.

Other Embodiments

Although the present invention has been described in detail, it should be understood that various changes, substitutions, and alterations can be made hereto without departing from the spirit and scope of the invention as defined by the appended claims.

What is claimed is:

1. A system for producing holographic stereograms (holograms) on-demand by an individual customer, from source material provided by the customer, comprising:

a data acquisition station having a data acquisition processor that receives image data based on the source material and a customer-based preview processor that displays a representation of the hologram for viewing by the customer;

an image processing station having an image processor operable to generate hogel data based on image data received from the data acquisition station; and a printing station having a spatial light modulator for receiving the hogel data from the image processor and for displaying holographic object images, and having a printer for producing a master holographic stereogram;

wherein the data acquisition station is in data communication with the image processing station and the printing station.

2. The system of claim 1, wherein the data acquisition station is remote from the image processing station and the printing station.

3. The system of claim 1, wherein the image processing station also has an operator-based preview processor operable to display a representation of the hologram for viewing by an operator of the image processor.

4. The system of claim 1, wherein the data acquisition station is a personal computer.

5. The system of claim 4, wherein the data communication is accomplished via the Internet.

6. The system of claim 4, wherein the data acquisition processor and the customer-based preview processor execute with programming downloaded to the personal computer.

7. The system of claim 4, wherein the customer-based preview processor displays preview images generated at a remote server.

8. The system of claim 1, wherein the data acquisition processor receives at least input from a video source.

9. The system of claim 1, wherein the data acquisition processor receives at least input from two dimensional printed material.

10. The system of claim 1, wherein the data acquisition station further has a compositing processor for combining image data from different source material.

11. The system of claim 1, wherein the data acquisition station further has a graphics database for storing image data to be added to image data provided by a customer.

12. The system of claim 1, wherein the data acquisition station further has a digitizer for providing image data from source material provided by a customer.

13. The system of claim 1, further comprising a replicating station for producing hologram copies from the master hologram.

14. The system of claim 1, wherein the image processing station and printing station are geographically remote and in data communication.

15. The system of claim 1, wherein the data acquisition processor delivers 2D sequence data to the image processor.

16. The system of claim 1, wherein the data acquisition processor delivers computer generated 3D graphics data to the image processor.

17. A method for producing holographic stereograms (holograms) on-demand for an individual customer, from customer-provided source material, comprising the steps of:

acquiring image data at a data acquisition station having a data acquisition processor that receives image data based on the source material and a customer-based preview processor that displays a representation of the hologram for viewing by the customer, wherein the data acquisition station is a personal computer;

delivering the image data to an image processing station having an image processor operable to generate hogel data based on image data received from the data acquisition station; and delivering the hogel data to a printing station having a spatial light modulator for receiving the hogel data from the image processor and for displaying holographic object images, and having a printer for producing a master holographic stereogram, wherein data acquisition station is in data communication with the image processing station and the printing station, and wherein the data communication is accomplished via the Internet.

18. The method of claim 17, wherein the data acquisition station is remote from the image processing station and the printing station.

19. The method of claim 17, wherein the image processing station also has an operator-based preview processor operable to display a representation of the hologram for viewing by an operator of the image processor.

20. The method of claim 17, wherein the data acquisition processor and the customer-based preview processor execute with programming downloaded to the personal computer.

21. The method of claim 17, wherein the customer-based preview processor displays preview images downloaded from a server.

22. The method of claim 17, wherein the data acquisition processor receives at least input from a video source.

23. The method of claim 17, wherein the data acquisition processor receives at least input from two dimensional printed material.

24. The method of claim 17, further comprising the step of compositing image data from different source material.

25. The method of claim 24, wherein the compositing occurs at the data acquisition station.

26. The method of claim 24, wherein the compositing occurs at a server site, such that the pre-view processor displays composited preview images downloaded from the server site.

27. The method of claim 17, wherein the image processing station and printing station are geographically remote and in data communication.

28. The method of claim 17, wherein the data acquisition processor delivers 2D sequence data to the image processor.

29. The method of claim 17, wherein the data acquisition processor delivers computer generated 3D graphics data to the image processor.

* * * * *